Sept. 13, 1932.                S. G. MALBY                1,877,342
                        METHOD OF MAKING QUILLS
                          Filed June 17, 1930
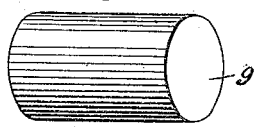
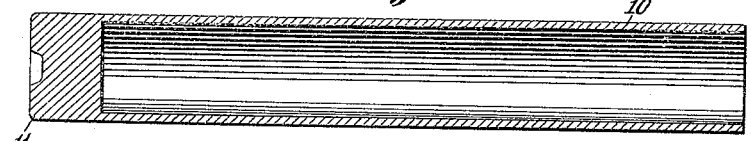
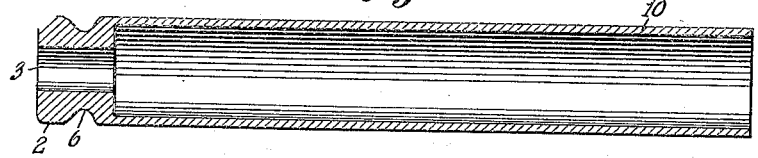
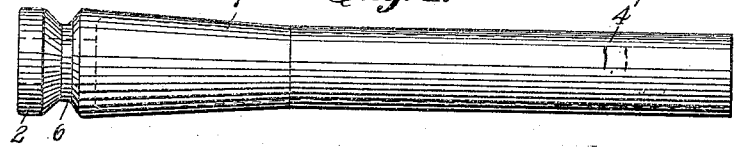
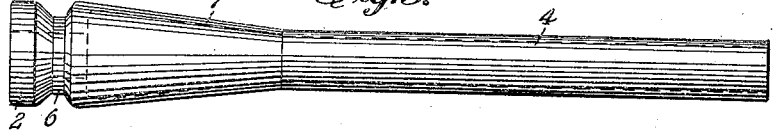

Patented Sept. 13, 1932

1,877,342

UNITED STATES PATENT OFFICE

SETH G. MALBY, OF TENAFLY, NEW JERSEY, ASSIGNOR TO ALUMINUM SCREW MACHINE PRODUCTS COMPANY, OF EDGEWATER, NEW JERSEY, A CORPORATION OF NEW JERSEY

METHOD OF MAKING QUILLS

Application filed June 17, 1930. Serial No. 461,698.

This invention relates to quills, such as are used in loom shuttles, and to the method of producing the same.

One of the objects of the present invention is to provide a strong, rugged and inexpensive one-piece quill adapted to effectively withstand the severe use to which it is subjected.

Another object of this invention is to provide a quill of the cone bobbin type having a bearing in one end thereof and a stem at the opposite end, a mounting groove adjacent said bearing and a conical portion intermediate said bearing and stem, the free end of the stem rounded and may be closed.

A further object of this invention is to provide a method of producing quills of the type above mentioned.

Other objects will appear from the following description, appended claims and accompanying drawing in which:

Figure 1 designates a slug of metal from which the quill may be fabricated.

Figures 2 to 6, inclusive, illustrate the various stages through which the material passes in the process of producing the quill.

Figure 7 is a plan view of a quill constructed in accordance with the principles of this invention.

Referring now to the drawing wherein like reference numerals designate like parts, and particularly Figure 7, the reference numeral 1 designates the quill constituting one part of this invention. It is preferably formed of a light metal, such as aluminum or aluminum alloy, and is provided on one end thereof with a base 2 having an aperture 3 and constituting a bearing, whereby the quill may be mounted on a spindle in any suitable manner. The opposite end portion consists of a cylindrical stem 4, the free end 5 of which is rounded and may be closed, as illustrated.

Adjacent the base 2 there is provided a mounting groove 6, and intermediate the base 2 and the cylindrical stem 4, preferably adjacent the groove 6 and the inner end of said stem, is a tapering or conical body portion 7.

In order to prevent slippage of the thread wound on the quill, and particularly the first layers thereof, the conical portion 7 is provided with grooves 8.

The quill above described may be produced by various methods. The method which I prefer is for the most part a combination of extrusion and swaging. According to this method, a suitable slug of the desired metal 9 is placed in an extrusion press and extruded to form a tubular member 10 having a relatively thick bottom 11, as illustrated in Figure 2. The bottom 11 is machined to form the bearing and the mounting groove. Specifically, the bottom 11 is drilled or otherwise bored to provide the hole 3, and, prior to, subsequent to, or simultaneous with the drilling operation, the peripheral surface of the bottom is subjected to a turning operation, whereby the mounting groove 6 is formed. The tubular member 10 is then swaged to produce the cylindrical stem 4' and the conical portion 7'. At the end of this operation, the article has the desired contour but is somewhat larger than desired. Hence, the article is again subjected to a swaging operation whereby the conical portion and stem are reduced to the desired sizes, as illustrated in Figure 5. After the various elements of the quill have been made of the desired dimensions, the grooves 8 are formed in the conical portion, and in the preferred procedure, these grooves are produced by being either machined or rolled therein. The article resulting from these steps is that shown in Figure 6, wherein it will be noted that the cylindrical stem is open at its free end. Such a construction might, when contacting with the thread, fray or tear it. To avoid this, the open end is rounded and may be closed as indicated by the reference numeral 5. Usually this is the final operation in the process.

The quill above described is formed of a single piece of metal. It has no combined parts which might become loosened when positioned or subjected to its destined use. Because of the material of which it is made, the quill is light in weight. By reason of the details of construction of the base, and particularly the bearing, this portion of the quill will not chip off or wear through when used.

It is obvious that the exact sequence of steps hereinbefore set forth is not essential to produce the quill. Moreover, it is not essential to employ the exact number of operations as herein set forth. In many instances two or more steps may be combined. Though the first step of the herein described process is the subjection of a slug to an extruding operation, this is not essential to the successful practice of the method. Any tubular member having a closed end may serve as the initial material.

Since it is obvious that various changes may be made in the specific details hereinabove set forth, this invention is not restricted thereto except as set forth in the appended claims.

I claim:

1. A method of producing a one-piece quill which comprises forming a bearing in the closed end of a tubular member, swaging the tubular member to provide a cylindrical stem at one end thereof of a reduced diameter and a conical portion intermediate said bearing and cylindrical stem, and grooving said conical portion.

2. A method of producing a one-piece quill which comprises forming a bearing in the closed end of a tubular member, swaging the tubular member to provide a cylindrical stem at one end thereof of a reduced diameter and a conical portion intermediate said bearing and cylindrical stem, grooving said conical portion, and rounding the free end of said cylindrical stem.

3. A method of producing a one-piece quill which comprises forming a bearing in the closed end of a tubular member and a mounting groove adjacent said bearing, swaging the tubular member to provide a cylindrical stem at one end thereof of a reduced diameter and a conical portion intermediate said bearing and cylindrical stem, and grooving said conical portion.

4. A method of producing a one-piece quill which comprises forming a bearing in the closed end of a tubular member and a mounting groove adjacent said bearing, swaging the tubular member to provide a cylindrical stem at one end thereof of a reduced diameter and a conical portion intermediate said bearing and cylindrical stem, grooving said conical portion, and rounding the free end of said cylindrical stem.

5. A method of producing a one-piece quill which comprises extruding a slug of metal to produce a tubular member having a thick bottom, boring a hole in said bottom, swaging the tubular member to provide a cylindrical stem at one end thereof of a reduced diameter and a conical portion intermediate said bearing and cylindrical stem, and grooving said conical portion.

6. A method of producing a one-piece quill which comprises extruding a slug of metal to produce a tubular member having a thick bottom, boring a hole in said bottom, swaging the tubular member to provide a cylindrical stem at one end thereof of a reduced diameter and a conical portion intermediate said bearing and cylindrical stem, grooving said conical portion, and rounding the free end of said cylindrical stem.

7. A method of producing a one-piece quill which comprises extruding a slug of metal to produce a tubular member having a thick bottom, boring a hole and forming a mounting groove in said bottom, swaging the tubular member to provide a cylindrical stem at one end thereof of a reduced diameter and a conical portion intermediate said bearing and cylindrical stem, and grooving said conical portion.

8. A method of producing a one-piece quill which comprises extruding a slug of metal to produce a tubular member having a thick bottom, boring a hole and forming a mounting groove in said bottom, swaging the tubular member to provide a cylindrical stem at one end thereof of a reduced diameter and a conical portion intermediate said bearing and cylindrical stem, grooving said conical portion, and rounding the free end of said cylindrical stem.

In testimony whereof, I have affixed my signature to this specification.

SETH G. MALBY.